(12) United States Patent
Abel et al.

(10) Patent No.: US 6,886,971 B2
(45) Date of Patent: May 3, 2005

(54) HEADUP DISPLAY

(75) Inventors: Heinz-Bernhard Abel, Grossostheim (DE); Heinrich Noll, Gross-Umstadt (DE)

(73) Assignee: Siemens Aktiengesellschaft, München (DE)

(*) Notice: Subject to any disclaimer, the term of this patent is extended or adjusted under 35 U.S.C. 154(b) by 141 days.

(21) Appl. No.: 10/235,765

(22) Filed: Sep. 4, 2002

(65) Prior Publication Data

US 2003/0099025 A1 May 29, 2003

(30) Foreign Application Priority Data

Sep. 7, 2001 (DE) .......................................... 101 44 075

(51) Int. Cl.[7] .............................................. B60Q 1/26
(52) U.S. Cl. ........................... 362/503; 362/29; 362/30; 362/135; 362/230; 362/330
(58) Field of Search ................................. 362/503, 489, 362/29, 30, 135, 230, 231, 330, 339; 359/15; 345/44–46, 82, 83

(56) References Cited

U.S. PATENT DOCUMENTS

| 5,317,170 A | | 5/1994 | Paoli |
| 5,583,349 A | | 12/1996 | Norman et al. |
| 5,633,623 A | * | 5/1997 | Campman ................... 340/321 |
| 5,806,969 A | | 9/1998 | Rosengren |
| 6,132,072 A | | 10/2000 | Turnbull |
| 6,259,423 B1 | * | 7/2001 | Tokito et al. ................... 345/76 |
| 6,366,116 B1 | * | 4/2002 | Juang ........................... 326/37 |
| 6,430,339 B1 | * | 8/2002 | Hulse et al. ................... 385/33 |
| 2002/0084952 A1 | * | 7/2002 | Morley et al. ................ 345/32 |

FOREIGN PATENT DOCUMENTS

| DE | 19502542 | | 8/1996 | |
| DE | 19708610 | | 9/1998 | |
| DE | 19943578 | | 3/2001 | |
| EP | 0424950 | | 5/1991 | |
| EP | 0516940 | | 12/1992 | |
| JP | 403113434 | * | 9/1989 | ........... G03B/21/62 |
| JP | 2002-76312 | * | 8/2000 | ........... H01L/27/14 |
| WO | 0070691 | | 11/2000 | |

* cited by examiner

*Primary Examiner*—Sandra O'Shea
*Assistant Examiner*—Mark Tsidulko
(74) *Attorney, Agent, or Firm*—Martin A. Farber

(57) ABSTRACT

A headup display having an image forming unit 1 for forming an item of image information to be displayed that can be projected as light beams 2 by the image forming unit 1 or via an optical projection system onto a partially reflecting windshield pane 7. The image forming unit 1 has an OLED display 8 for forming the image information displayed, in front of which there is arranged a light directing element 14 by which the light beams 2 produced by the OLED display 8 can be directed approximately parallel to one another.

18 Claims, 2 Drawing Sheets

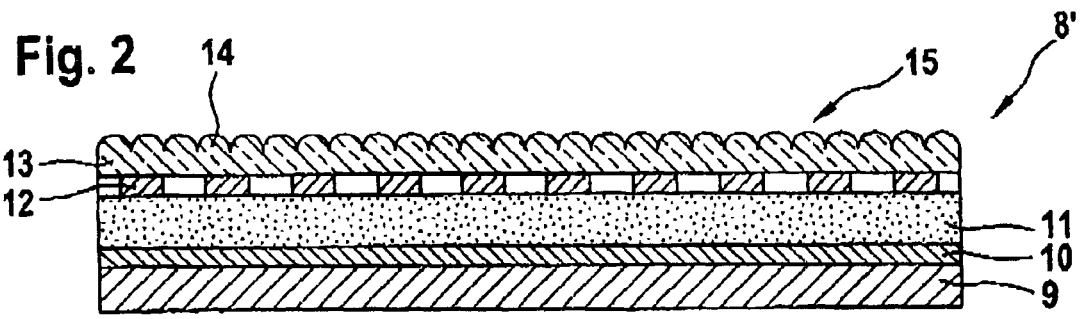
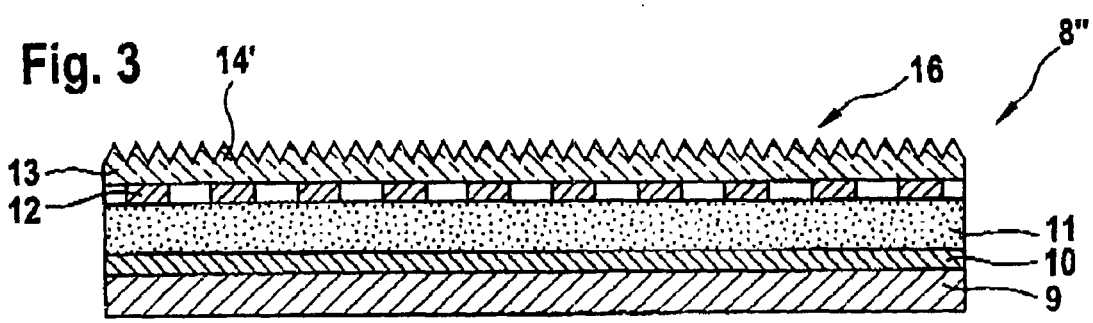
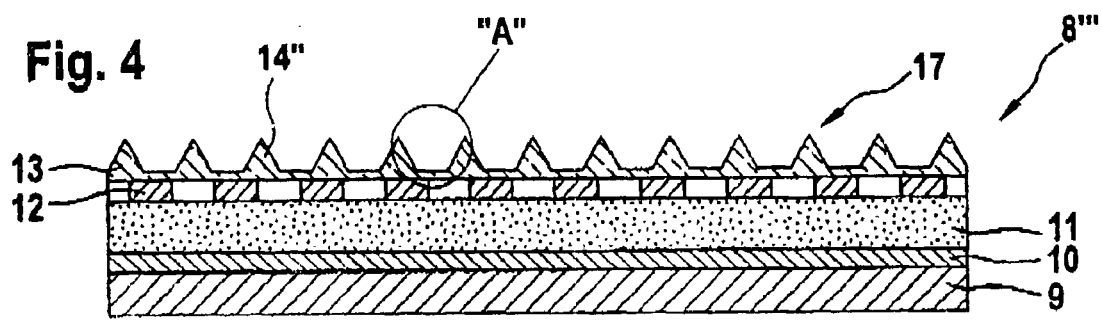
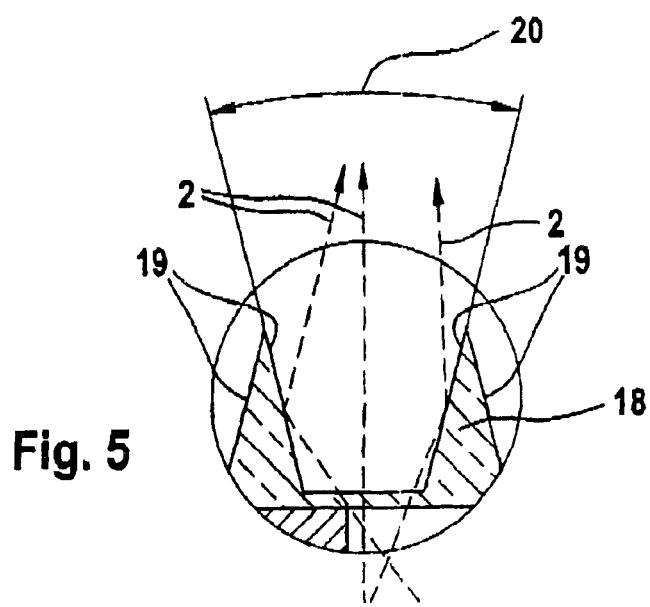

HEADUP DISPLAY

FIELD AND BACKGROUND OF THE INVENTION

The invention relates to a headup display, in particular for a motor vehicle, having an image forming unit for forming an item of image information to be displayed that can be projected as light beams by the image forming unit directly or via an optical projection system onto a partially reflecting pane, in particular onto a windshield pane.

In the case of such headup displays, it is known to form the image forming unit as a liquid crystal display which produces the image information to be displayed. By means of a light source arranged behind the liquid crystal display and trans illuminating the liquid crystal display the image information produced by the liquid crystal display is projected as light beams directly or via an optical projection system onto a partially reflecting region of a windshield pane in the visual range of a driver of a motor vehicle and reflected to the driver from there. This produces a virtual image, visible to the driver, at a spacing of a few meters approximately in the area of the beginning of the radiator hood of the motor vehicle which the driver can view, without a problem, simultaneously with the surround field without accommodating the eyes.

In order for such a virtual image to be effectively detectable in the case of as far as possible all ambient conditions, in particular high ambient brightness, and for alphanumeric characters to be effectively readable, its luminance must as far as possible be greater than 5000 cd/m$^3$. On the basis of the light losses at mirrors and/or lenses and at the windshield pane, this involves a luminance of 20,000–30,000 cd/m$^3$ on the surface of the liquid crystal display. If the liquid crystal display is a colored liquid crystal display, a luminance of 500,000 cd/m$^3$ must be produced by the light source behind the liquid crystal display because of the low transmission of a colored liquid crystal display of 4–5%. In this case, the colored liquid crystal display has a contrast of less than 150, and this leads to a lit-up background of the liquid crystal display that has a disturbing effect.

The required high luminance of the backlighting of the liquid crystal display requires a light source of correspondingly large dimensions with a high energy consumption, the large developed heat of which must be dissipated by large heat sinks, fans or other heat dissipators.

Moreover, the design of the headup display is complicated and requires a large installation space.

SUMMARY OF THE INVENTION

It is therefore an object of the invention to create a headup display of the type mentioned at the beginning which has a simple design requiring little installation space, permits color displays and exhibits good readability with high contrast in all ambient conditions.

This object is achieved according to the invention by virtue of the fact that the image forming unit has an OLED display for forming the image information to be displayed, in front of which there is arranged a light directing element by which the light beams produced by the OLED display can be directed approximately parallel to one another.

Since the OLED (organic light emitting diodes) display is a self-luminous display, there is no need either for an additional light source or for large heat dissipating devices, and so the design is simple and the required installation space is kept small. Moreover, by contrast with the use of a liquid crystal display, as a self-luminous display the OLED display requires only a light quantity which is approximately twenty times less in accordance with the transmittance of a liquid crystal display.

In particular, a color representation is possible without additional outlay.

The neutral background of the OLED display leads to a high contrast, and thus to good readability.

Owing to the light directing element, a colored OLED display may have a luminance which is 10–20 times less than a corresponding backlit colored liquid crystal display, since the light emitted by the OLED display is focused by the light directing element into a small solid angle, and is thus raised to a high useful luminance. This can reach 20,000–30,000 cd/m$^3$, which leads to a good virtual representation in color.

In order to achieve a good virtual representation, it suffices when the light beams can be directed at an angle of less than approximately 30°.

In order to reduce the overall space required, the light directing element can be arranged on the display surface of the OLED display projecting the light beams.

The light directing element can either be a flexible transparent film, or else a rigid transparent plate.

In order to reduce a light loss, the light directing element is preferably applied to the surface of the OLED display without an optical interface, since in this case no reflection losses, in particular no total reflection losses, occur during transition of light from the OLED display to the light directing element.

To this end, it is possible, in particular, for the light directing element to be bonded onto the surface of the OLED display.

If the transparent substrate of the OLED display is formed, on the side thereof projecting the light beams, as light directing element, this component takes over a double function, and this not only leads to a reduction in the components, but also excludes light loss problems by reflection losses of the above-named type.

The light directing element is preferably formed with a light guiding structure extending over its surface.

It is possible in this case for the light guiding structure to be, in a way that is easy to produce, a prismatic, in particular a microprismatic structure, a lenticular, in particular a microlenticular structure or a directional reflector structure, in particular a directional microreflector structure.

If the OLED display has a point matrix electrode which is, in particular, freely programmable, a display of variable image information of high variability is possible with an appropriately serial drive.

The OLED display can be a fully color-capable display.

In order to achieve a size correction of the image information to be represented, and to compensate a distortion of the image owing to a curvature of the pane, it can be possible for the light beams to be projected by the image forming unit via a mirror system onto the partially reflecting pane, for which purpose the mirror system can have at least one plane mirror and at least one free form planar mirror.

If a transparent cover is arranged between the mirror system and the partially reflecting pane, this serves to protect the mirror system.

The transparent cover is preferably arcuately formed in this case in order to avoid dazzling by the cover pane.

BRIEF DESCRIPTION OF THE DRAWINGS

Exemplary embodiments of the invention are illustrated in the drawing and will be described in more detail below. In the drawing:

FIG. 2 shows a first exemplary embodiment of an image forming unit of a headup display according to FIG. 1, FIG. 3 shows a second exemplary embodiment of an image forming unit of a headup display according to FIG. 1, FIG. 4 shows a third exemplary embodiment of an image forming unit of a headup display according to FIG. 1, FIG. 5 shows an enlarged illustration of the detail "A" from FIG. 4.

DETAILED DESCRIPTION OF THE PREFERRED EMBODIMENT

Figure 1:
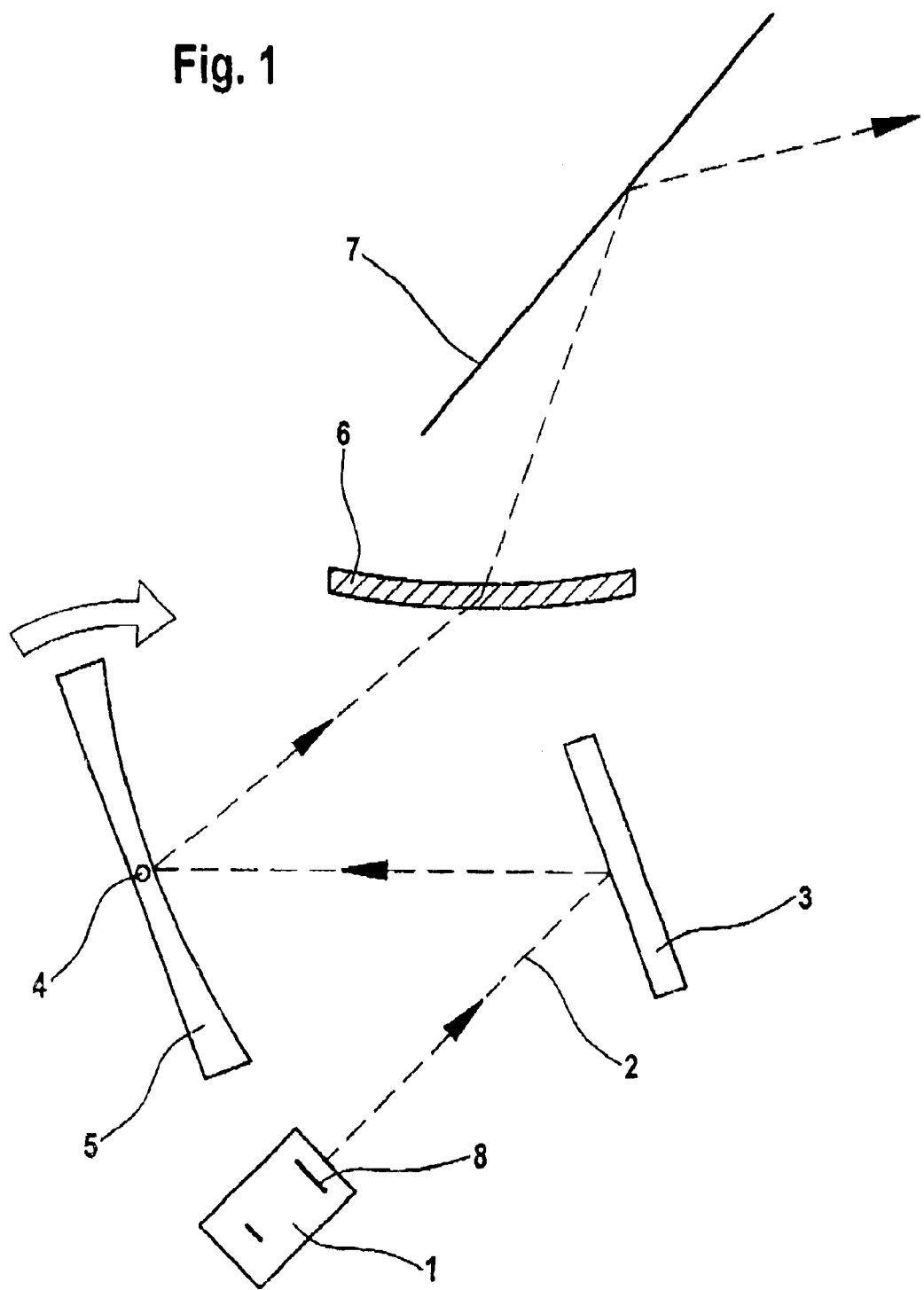
FIG. 1 shows a schematic illustration of a headup display.

The headup display, illustrated in FIG. 1, for a motor vehicle has an image forming unit 1 which has an OLED display 8. The image information produced by the OLED display which can, for example, be symbols for tank, temperature and oil level, navigation instructions of a navigation device, or else alphanumeric data on the traveling speed or the engine speed, is projected as light beams 2 via a mirror system with a plane mirror 3 and a concave free form mirror 5 which can be rotated about an axis 4, as well as via an arcuate transparent cover 6 onto a windshield pane 7, formed to be partially reflecting, of the motor vehicle and reflected by the windshield pane 7 into the field of view of a driver of the motor vehicle.

The OLED displays 8', 8" and 8'" illustrated in FIGS. 2 to 5 have a rear substrate 9 which can be formed as a plastic film or as a rigid glass plate. Applied to the substrate 9 as rear electrode 10 is a planar electrode made from metal for example.

The latter bears, in turn, an OLED (Organic Light Emitting Diodes) layer 11 which can consist of an organic polymer.

Arranged on the OLED layer 11 is a transparent point matrix electrode 12 made from indium-tin-oxide (ITO), for example, which comprises a multiplicity of pixel points which can be driven separately by a voltage. Upon application of a voltage to the rear electrode 10 and individual pixel points of the point matrix electrode 12, the OLED material of the OLED layer 11 is excited to emit light in the region of the driven pixel points.

The emitted light is radiated to the front side of the OLED display 8', 8" and 8'", on which a transparent front substrate 13 is bonded on the point matrix electrode 12. The front substrate 13 is formed as a light directing element 14, 14' and 14" with a light guiding structure extending over its entire front surface.

In FIG. 2, the light guiding structure is a microlenticular structure 15 of mutually adjoining lenses of small size. Instead of the microlenticular structure in FIG. 2, the light guiding structure in FIG. 3 is a microprismatic structure 16 of mutually adjoining prisms of small size.

The light guiding structure present in FIGS. 4 and 5 is a directional microreflector structure 17 of reflector elements 18, arranged close to one another, of small size, whose outer surfaces 19 are silvered. The inclination of the outer surfaces 19 to the plane of the light directing element 14" is such that the light beams 2 passing through between the reflector elements 18 and emitted by the OLED layer 11 are radiated within an angle 20 of at most 30° through the silvered outer surfaces 19 of the reflector elements 18 in a fashion directed to the front side (FIG. 5).

The light emitted by the OLED layer 11 is likewise radiated within an angle of at most 30° in a fashion directed to the front side by the lenses and prisms in FIGS. 2 and 3.

Because of the microstructure of the light directing elements 14, 14' and 14", the image projected by the light beams 2 onto the windshield pane 7 has such a high resolution that the individual pixels cannot be resolved by the eye of the driver, and so a homogeneous image can be seen.

The light directing element can also comprise a layer system which has a plurality of layers and results in a direction of light corresponding to the light directing elements described above.

What is claimed is:

1. Headup display, in particular for a motor vehicle, having an image forming unit for forming an item of image information to be displayed that is projectable as light beams by the image forming unit directly or via an optical projection system onto a partially reflecting pane, in particular onto a windshield pane, wherein the image forming unit (1) has an OLED display (8, 8 ', 8", 8'") for forming the image information to be displayed, in front of which there is arranged a light directing element (14, 14 ', 14") by which the light beams (2) produced by the OLED display (8, 8 ', 8", 8'") are directable approximately parallel to one another; and the light beams (2) are directable at an angle (20) of less than approximately 30°.

2. Headup display according to claim 1, wherein the light directing element (14, 14', 14y) is arranged on a display surface of the OLED display (8', 8", 8'") projecting the light beams (2).

3. Headup display according to claim 2, wherein the light directing element (14, 14', 14") is a transparent film.

4. Headup display according to claim 2, wherein the light directing element is a transparent plate.

5. Headup display according to claim 2, wherein the light directing element (14, 14', 14") is applied to the surface of the OLED display (8, 8', 8–, 8'") without an optical interface.

6. Headup display according to claim 5, wherein the light directing element (14, 14', 14") is bonded onto the surface of the OLED display (8', 8", 8'").

7. Headup display according to claim 1, wherein a transparent substrate (13) of the OLED display (8', 8", 8'") is formed, on a side thereof projecting the light beams (2), as the light directing element (14, 14', 8").

8. Headup display according to claim 1, wherein the light directing element (14, 14', 14") is formed with a light guiding structure extending over its surface.

9. Headup display according to claim 8, wherein the light guiding structure is a prismatic, in particular a microprismatic structure (16).

10. Headup display according to claim 8, wherein the light guiding structure is a lenticular, in particular a microlenticular structure (15).

11. Headup display according to claim 8, wherein the light guiding structure is a directional reflector structure, in particular a directional microreflector structure (17).

12. Headup display according to claim 1, wherein the OLED display is freely programmable.

13. Headup display according to claim 1, wherein the OLED display is a fully color-capable display.

14. Headup display according to claim 1, wherein the light beams (2) are projectable by the image forming unit (1) via a mirror system onto the partially reflecting pane.

15. Headup display according to claim 14, wherein the mirror system has at least one plane mirror (3) and at least one free form planar mirror (5).

16. Headup display according claim 15, wherein a transparent cover (6) is arranged between the mirror system and the partially reflecting pane.

17. Headup display according to claim 16, wherein the transparent cover (6) is arcuate.

18. Headup display, in particular for a motor vehicle, having an image forming unit for forming an item of image information to be displayed that is projectable as light beams by the image forming unit directly or via an optical projection system onto a partially reflecting pane, in particular onto a windshield pane, wherein the image forming unit (1) has an OLED display (8, 8', 8", 8''') for forming the image information to be displayed, in front of which there is arranged a light directing element (14, 14', 14") by which the light beams (2) produced by the OLED display (8, 8', 8", 8''') are directable approximately Parallel to one another, and the OLED display (8', 8", 8''') has a point matrix electrode (12).

* * * * *